A. H. THIEME.
ANIMAL YOKE.
APPLICATION FILED AUG. 20, 1910.
987,025.
Patented Mar. 14, 1911.
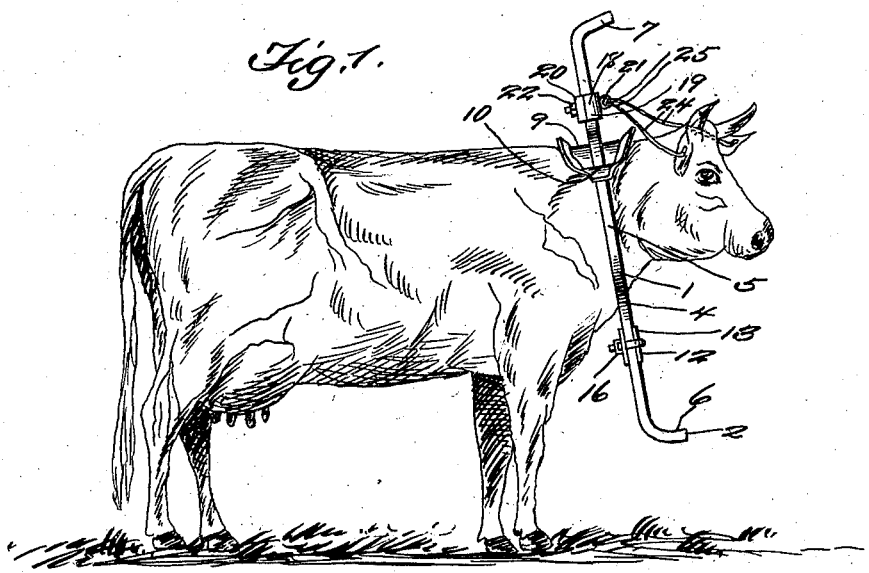
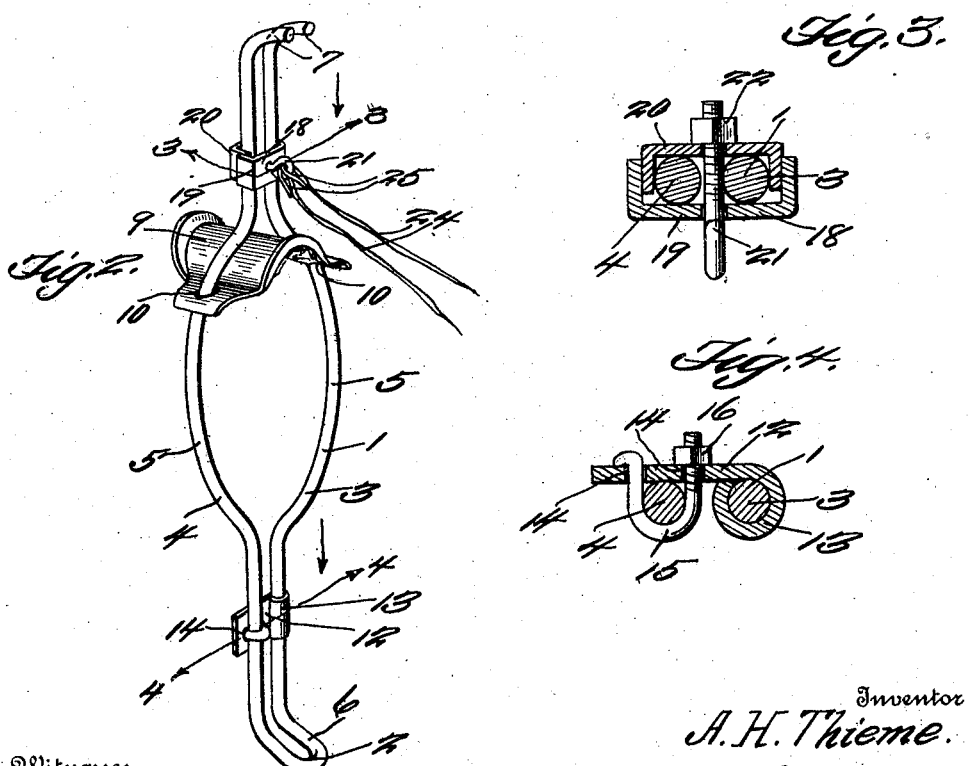
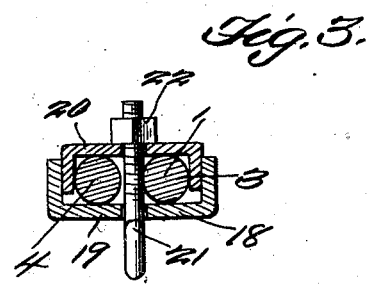
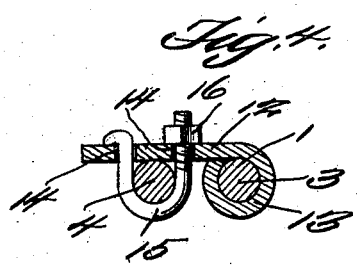
Inventor
A. H. Thieme.
By D. Swift
Attorneys
Witnesses

UNITED STATES PATENT OFFICE.

ANDREW H. THIEME, OF HEBRON, NEBRASKA.

ANIMAL-YOKE.

987,025.   Specification of Letters Patent.   Patented Mar. 14, 1911.

Application filed August 20, 1910. Serial No. 578,145.

*To all whom it may concern:*

Be it known that I, ANDREW H. THIEME, a citizen of the United States, residing at Hebron, in the county of Thayer and State of Nebraska, have invented a new and useful Animal-Yoke; and I do hereby declare the following to be a full, clear, and exact description of the invention, such as will enable others skilled in the art to which it appertains to make and use the same.

This invention relates to a new and useful animal yoke, and the principal object in view, is to produce a device of this design, adapted to prevent animals, for example, cows and the like, from crawling under a fence, or jumping the same.

The invention aims as a further object to provide a yoke, involving various novel features of construction.

A further object of the invention is to produce a yoke, composed of a single length of metal bent upon itself and turned into a forwardly projecting hook at the bent portion, and provided with curved portions to conform to the contour of the neck of the animal.

A further feature of the invention is the production of a movable pad member carried by said curved portion, to rest upon the upper part of the neck of the animal. This pad member also is curved to conform to the shape or contour of the upper part of the neck of the animal, there being no sharp corners or angles upon this pad member, to in any way injure him.

Another object of the invention is to extend the upper free ends of the single length of metal upwardly sufficient to form the forwardly extending hooks.

A further object of the invention is the production of clamping members for the upper and lower parts of the yoke, for holding the side members of the yoke in their correlative positions.

A further feature of the invention is to provide means connected between the upper clamping member and the ears of the animal, in order that when the animal attempts to pass under a fence, the upper forward hooked portion of the yoke will come in contact with the fence, thus imparting a pulling action on the means between the ears of the animal and the upper clamp of the yoke, and by thus so doing, the animal will receive pain. By this pain, the animal will be induced to discontinue any further attempts to pass under the fence, thus frustrating his desire for passing out of the field.

Further features and combination of parts will be hereinafter set forth, shown in the drawings, and pointed out in the appended claims.

In the drawings:—Figure 1 is a view showing the application of the yoke upon an animal. Fig. 2 is an enlarged perspective view of the yoke removed from the animal. Fig. 3 is a sectional view on line 3—3 of Fig. 2, through the upper clamp of the yoke. Fig. 4 is a sectional view through the lower clamp of the yoke taken upon line 4—4 of Fig. 2.

Referring to the annexed drawings, 1 represents a single length of metal, which is bent upon itself, as indicated at 2. By bending this single length of metal, the same forms two side members 3 and 4 of the yoke. These side members or portions are curved as shown at 5, to conform to the curvature of the neck of the animal. The point upon which the single length of metal is bent, is extended forwardly, to provide the hook 6, which will engage a fence, in case the animal attempts to jump the same.

The side members or portions 3 and 4 of the yoke are extended upwardly, and parallel to one another beyond their curved portions, and are bent forwardly to form the hooks 7. These hooks 7 are designed to engage a fence when the animal attempts to pass under the same.

9 represents a member, which acts as a pad for the animal's neck. This member has its edges rounded or curved upwardly, in order that the animal will not be injured, by sharp corners and angles coming in contact with him. This member may be provided, as shown in Fig. 2, with a pad upon the surface thereof which engages the animal. This member is movable upon the side members or portions 3 and 4 of the yoke, the same being provided with apertures 10 to receive the said side members.

The parallel portions of the side members or portions 3 and 4, below the curved parts of the yoke, are held in correlation by means of a novel clamp 12. This clamp 12 consists of a piece of sheet metal, one edge of which is turned into a roll 13 to receive the side member or portion 3, while the flat portion of the sheet metal plate is provided with a pair of apertures 14. 15 represents a hook bolt, the hook of which engages one of the apertures, as shown clearly in Fig. 4, while the curved portion of the hook bolt engages the side member or portion 4 of the yoke, in order to hold the same in place. The threaded end of the hook bolt is passed through the other aperture, and to it a nut 16 is threaded, the purpose of which being to hold the hook bolt securely in its place.

The upper clamp 18, for holding the members or portions 3 and 4 in their proper correlative positions, consists of two U-shaped plates 19 and 20, one being smaller than the other, in order to be received between the flanges of the larger one. An eye bolt is passed between the side members or portions 3 and 4 of the yoke, and through apertures of the U-shaped members, and to the threaded end of this eye bolt 21 a nut 22 is secured, in order to hold the eye bolt and the U-shaped members securely in place. In applying the yoke to an animal, for instance, a cow, its ears are slitted, and passed through the slits, and then tied are flexible wires or stout twine 24. The other ends 25 of the flexible wires or twine are securely anchored in the eye of the eye bolt. It will be clearly evident that when an animal, so harnessed with a neck yoke, endeavors to pass under or over a fence, it will be prevented from so doing, and especially when it attempts to pass under the fence, it will receive pain in its ears, which will cause it to cease its endeavors to get by the fence.

The invention having been described, what is claimed as new and useful is:—

1. An animal yoke, comprising a single length of metal bent upon itself to form the side members thereof, and formed with upper and lower forwardly projecting hooks, means for holding the side members in correlation, and connecting means between one of said first named means and the animal's ears, and a pad member movably carried upon the side members.

2. An animal yoke comprising a single length of metal bent upon itself to form the side members thereof, and formed with upper and lower forwardly projecting hooks, upper and lower clamps for holding the side members in correlation, connecting means between the upper clamp and the animal's ears, and a pad member movably carried by the side members.

In testimony whereof I have signed my name to this specification in the presence of two subscribing witnesses.

ANDREW H. THIEME.

Witnesses:
B. A. YOUNG,
FRED OLTREN.